United States Patent
Lejeune

[15] 3,698,492
[45] Oct. 17, 1972

[54] HYDRAULIC BALANCE

[72] Inventor: Daniel Lejeune, Clermont-Ferrand, France

[73] Assignee: Compagnie Generale Des Etablissement Michelin Raison sociale Michelin & Cie, Clermont-Ferrand, France

[22] Filed: May 3, 1971

[21] Appl. No.: 139,697

[30] Foreign Application Priority Data

May 15, 1970 France.....................7018017

[52] U.S. Cl........................................177/1, 177/203
[51] Int. Cl. .........................G01g 17/00, G01g 5/04
[58] Field of Search..............177/126, 208, 209, 136

[56] References Cited

UNITED STATES PATENTS

| | | | |
|---|---|---|---|
| 3,305,036 | 2/1967 | Walters | 177/208 X |
| 2,969,968 | 1/1961 | Miller | 177/208 X |
| 1,227,505 | 5/1917 | Troll | 177/208 X |
| 2,095,268 | 10/1937 | Roberts | 177/209 X |
| 2,313,156 | 3/1943 | Kratt, Jr. | 177/208 X |

*Primary Examiner*—Richard B. Wilkins
*Assistant Examiner*—George H. Miller, Jr.
*Attorney*—Brumbaugh, Graves, Donohue & Raymond

[57] ABSTRACT

A hydraulic balance is provided which comprises two deformable parallel tubes containing a fluid under pressure and arranged between a lower base plate and an upper load supporting plate, each of the tubes forming part of a separate hydraulic circuit having a separate pressure measuring device.

2 Claims, 3 Drawing Figures

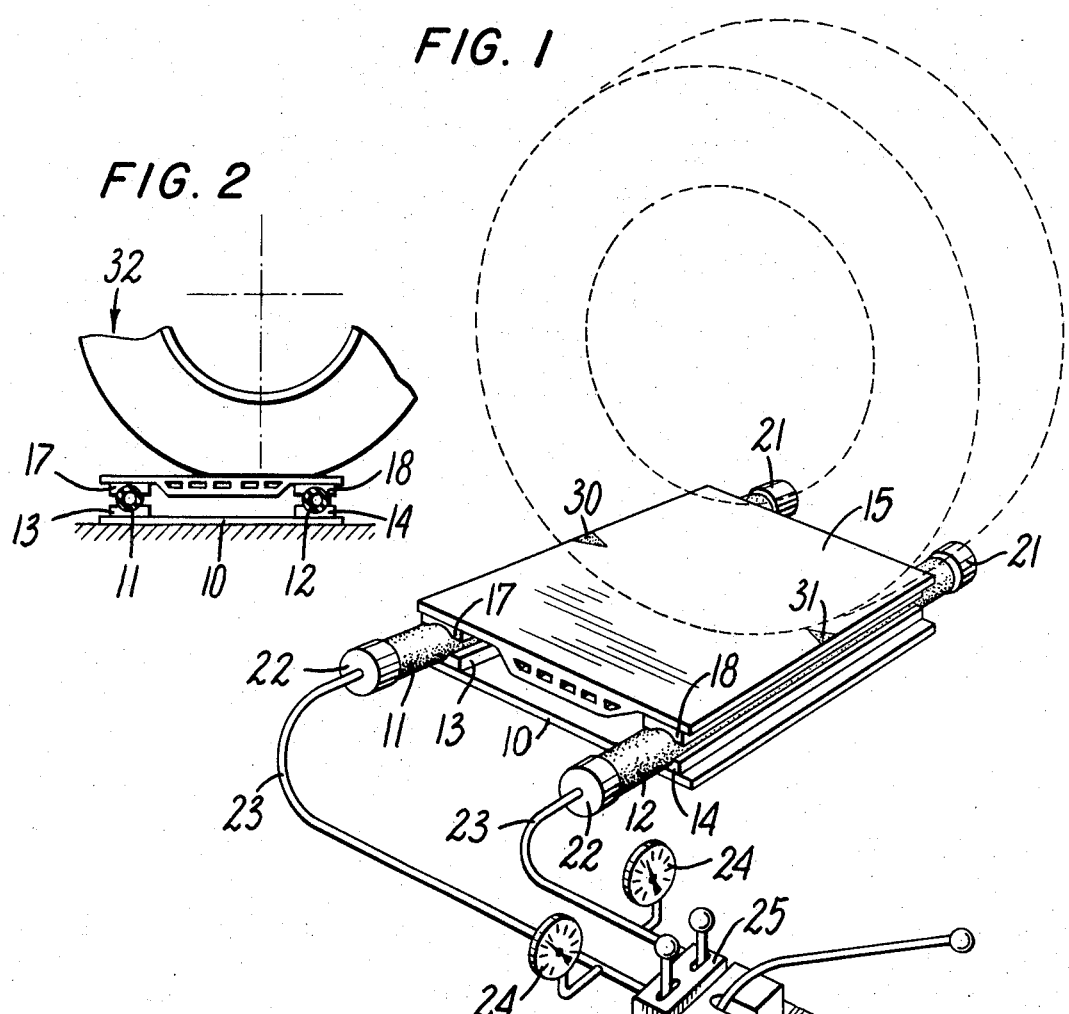
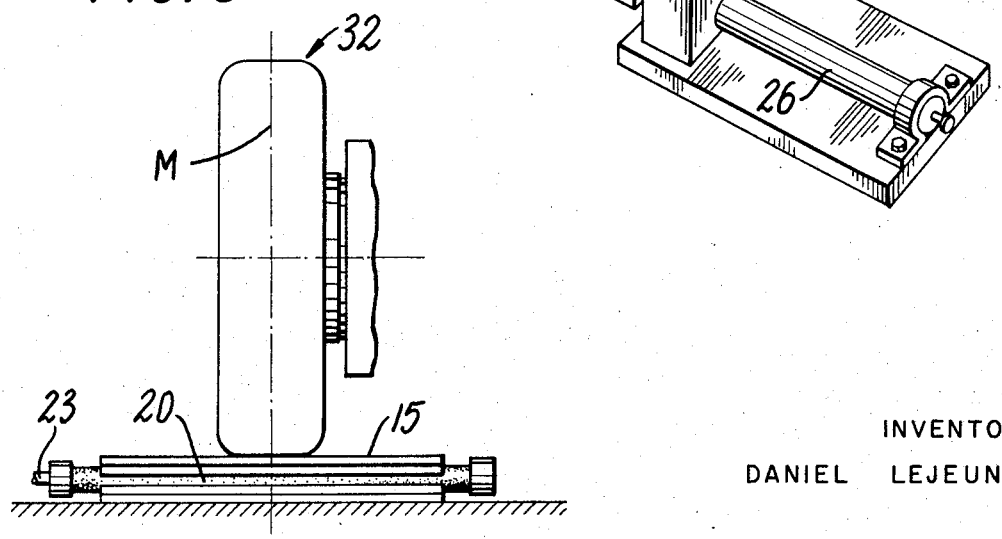
INVENTOR.
DANIEL LEJEUNE

HYDRAULIC BALANCE

The present invention relates to a hydraulic balance designed to measure the load exerted on the earth by each of the wheels of a vehicle, particularly heavy vehicles such as construction vehicles.

It is frequently necessary to establish the actual conditions of use of construction vehicles and in particular the total weight of the vehicle under load as well as the distribution of this weight over its various wheels. This is useful in particular in order to better adapt the tires to the working conditions of the vehicles for which they are intended.

It is of course desirable to be able to measure the load borne by the tires on the very place of operation of the vehicle without having to bring it to a weighing station. However, there is no weighing apparatus which is sufficiently strong, light, simple and accurate that it can be easily transported and installed on the construction site, can be used there to measure loads of several dozen tons and permits easy but reliable measurements.

The purpose of the invention is to fill this gap and to create a light but strong and accurate weighing apparatus.

The hydraulic balance in accordance with the present invention is characterized by the fact that it comprises, arranged between a lower plate forming the base and an upper plate forming the support for the load, two deformable parallel tubes containing a fluid under pressure and forming part of two separate hydraulic circuits, each provided with a pressure measuring device.

The principle of operation of the apparatus is as follows:

When the load to be measured is applied onto the upper plate which rests on the two tubes, the pressure in the tubes and in the hydraulic circuits of which they form a part increases, for instance by $\Delta P_1$ in one of the tubes and $\Delta P_2$ in the other. Experience shows that the sum $\Delta P_1 + \Delta P_2$, provided that certain precautions in operation are taken, is precisely related to the load. Calibration then makes it possible to determine the value of the load from the sum of the measured increases in pressure $\Delta P_1$ and $\Delta P_2$.

The only condition which must be satisfied is that the load act substantially uniformly and in any event symmetrically on the different portions of each tube in contact with the upper plate, without it being necessary for it to act equally on the two tubes. In practice, with the axes of the two tubes parallel, it is advisable that the point of application of the load be in the plane perpendicular to the axes of the two tubes which plane divides the portion of each tube in contact with the load bearing plate into two practically equal portions; it is not necessary for this point of application to be equally spaced between the two tubes. When operating in this fashion, the precision may reach 1 to 2 percent.

When it is desired to measure the load exerted on the earth by the wheel of a vehicle, it is relatively easy to see to it that the tire is on the upper plate of the balance in such a manner that its center plane is approximately perpendicular to the axes of the tubes and equally spaced from the ends of each tube. On the other hand, it would be very difficult to bring the axis of the wheel precisely at the midpoint between the two tubes.

One essential point of the invention is the use of two tubes forming part of separate hydraulic circuits, that is to say, hydraulic circuits which do not communicate with each other. If two communicating tubes were used as part of a single hydraulic circuit, the application of a load would result in an identical increase $\Delta P$ in both tubes. This increase in pressure $\Delta P$ would depend not only on the load but also on the distance of the load from the two tubes. In order to make a precise measurement, it would be necessary for the load to be placed precisely at an equal distance between both tubes, which is difficult to do in practice.

The invention will readily be understood by reference to the accompanying drawings in which one embodiment is shown. In the drawings:

FIG. 1 shows in perspective a hydraulic balance in accordance with the invention;

FIGS. 2 and 3 show on a smaller scale the balance with one wheel located on the balance, seen parallel and perpendicular to the axes of the tubes and of the wheel, respectively.

In the drawing, 10 is the lower plate of the balance which is intended to rest on the ground. On this plate there are arranged two parallel tubes 11 and 12 within housings 13 and 14, respectively, formed of channel irons affixed to the lower plate 10. An upper plate 15 rests on the tubes 11 and 12 via two channel irons 17 and 18, respectively, affixed to the upper plate 15.

Each tube 11 and 12 consists of a central portion 20 in contact with the two plates 10 and 15. This central portion is of rubber and has an interior reinforcement, for instance of metal wires, enabling it to withstand a high pressure, for example 100 or 200 bars.

These rubber tubes may, for instance, have an outside diameter of 105 mm. and have a reinforcement made of two layers of steel cable. A tube of the type described in French Pat. No. 1,489,191 is excellently suitable.

In addition to the central portion 20, each tube has on one end a cap 21 and on the other end a cap 22 connected by a conduit 23 to a pressure gauge 24, a distributor 25 and a manual hydraulic pump 26.

The hydraulic pump makes it possible to establish an initial pressure of, for instance, 10 bars in each tube 11 or 12 by injecting into it a suitable fluid which is compatible with rubber, for instance water or a mixture of water and soluble oil. This distributor 25 makes it possible to place the tubes 11 and 12 alternately in communication with the hydraulic pump. In the normal operation of the balance, the two hydraulic circuits, each formed of a tube 11 or 12, its conduit 23 and its pressure gauge 24, are not in communication with each other.

FIGS. 2 and 3 show a wheel 32 of a vehicle mounted on the balance. As can be noted from FIG. 3, the wheel 32 is arranged in such a manner that it is substantially centered axially of the tubes 11 and 12, the center plane M of the wheel tire being approximately equally distant from the side edges of the upper plate 15. For this purpose, centering marks 30 and 31 are painted on said plate to facilitate guidance. On the other hand, as shown in FIG. 2, it is not necessary for the wheel to be equally distant between the two tubes; this fact is very favorable since it is very difficult, if not impossible, precisely to center the wheel at equal distance between the two tubes.

In order to effect a weighing, the pressure in each tube 11 or 12 is first of all brought by means of the pump 26 to an arbitrarily selected initial value of, for instance, 10 bars. The vehicle is then advanced in such a manner that the wheel whose load is to be measured is placed in the position shown in FIGS. 2 and 3. The increases in pressure $\Delta P_1$ and $\Delta P_2$ are read from the two pressure gauges 24 and added together. A calibration curve or table gives the corresponding weight as a function of the sum of the increases in pressure.

When the weight or load is removed, the pressure drops back to a value close to and slightly less than the initial value as a result of hysteresis. Before effecting a new measurement it is preferable that the pressure in the two circuits be brought to zero and then again to the initial pressure of 10 bars.

The total weight of a hydraulic balance in accordance with the invention which makes possible the measurement of loads of 50 tons and more is about 100 kilograms distributed over several parts which can easily be handled. Of course, the invention is not limited to balances intended for the measurement of high loads; it is possible to use them for measuring loads of any value.

What is claimed is:

1. A hydraulic balance capable of accurately measuring the load on a tire of a heavy vehicle comprising two deformable parallel tubes defining a transverse symmetry plane and containing a liquid under equal pressure and arranged between a lower plate forming a base and an upper plate forming a support for the tire locatable along the transverse symmetry plane, each of said tubes forming part of a separate hydraulic circuit having a separate pressure measuring device and having means for distributing the liquid under equal pressure into each tube.

2. The method of accurately measuring the load on a tire of a vehicle which comprises locating the tire along the transverse symmetry plane atop two deformable parallel tubes containing a liquid under equal pressure, separately measuring the increase in pressure in each tube and determining the load from the sum of the increases in pressure.

* * * * *